United States Patent [19]

Freeman

[11] Patent Number: 4,902,787

[45] Date of Patent: Feb. 20, 1990

[54] METHOD FOR PRODUCING LIGHTFAST DISPERSE DYESTUFFS CONTAINING A BUILD-IN PHOTOSTABILIZER [MOLECULE] COMPOUND

[75] Inventor: Harold S. Freeman, Raleigh, N.C.

[73] Assignee: North Carolina State University, Raleigh, N.C.

[21] Appl. No.: 184,382

[22] Filed: Apr. 21, 1988

[51] Int. Cl.$^4$ .......................... D06P 1/16; D06P 1/18; D06P 1/17; D06P 1/20

[52] U.S. Cl. .................... 534/800; 534/799; 534/851; 546/204; 546/223; 548/260; 564/87; 564/88; 564/415; 564/443; 552/246; 552/247

[58] Field of Search .................. 534/851, 799, 800; 564/87, 88, 415, 443; 548/260; 546/204, 223; 260/377

[56] References Cited

U.S. PATENT DOCUMENTS 3,998,136 8/1968 Groebke et al. ................ 534/851 X
4,313,872 2/1982 Heinrich et al. ................ 534/851 X Primary Examiner—Floyd D. Higel
Attorney, Agent, or Firm—Bell, Seltzer, Park & Gibson

[57] ABSTRACT

A method of producing a UV lightfast disperse dyestuff comprising selecting a disperse dyestuff having predetermined chromophoric groups, selecting a photostabilizer compound, designing a hybrid disperse dye molecular structure which contains the chromophoric groups of the selected disperse dyestuff and also contains the molecular structural features of the selected photostabilizer compound, and synthesizing the thus designed hybrid disperse dyestuff molecule. Such a method produces a hybrid dye molecule which is a UV lightfast analog of a disperse dyestuff having predetermined chromophoric groups, said hybrid dye molecule containing in its molecular structure the chromophoric groups of the selected disperse dyestuff and also containing the molecular structural features of a photostabilizer compound.

17 Claims, No Drawings

METHOD FOR PRODUCING LIGHTFAST DISPERSE DYESTUFFS CONTAINING A BUILD-IN PHOTOSTABILIZER [MOLECULE] COMPOUND

FIELD AND BACKGROUND OF THE INVENTION

This inventiion relates to lightfast disperse dyestuffs and to methods of designing and preparing such dyestuffs. In particular, this invention relates to disperse dyestuffs which are so designed that their molecular structures impart lightfastness to the dyestuff.

Disperse dyestuffs were developed for use in dyeing hydrophobic synthetic fibers such as cellulose acetate, nylon, polyester and acrylics. In recent years considerable development has been directed to producing new disperse dyestuffs with improved properties for many new applications.

One of the most important considerations in determining the suitability of dyestuffs for specific applications is lightfastness. Dyes tend to undergo photodegradation upon exposure to light, especially light in the ultraviolet spectrum, resulting in fading of the dyed textile fibers. Automobile upholstery fabrics, for example, are used in perhaps one of the most severe and demanding environments for dyestuffs. Automobile interiors may be exposed to direct sunlight over extended periods of time, and may encounter extreme high temperatures and humidities. Consequently, automobile upholstery fabrics require optimum lightfastness. Most of the disperse dyestuffs presently available do not provide the high level of lightfastness demanded in automotive applications, especially where relatively dark colors are required.

Efforts to improve the lightfastness of disperse dyed fibers have been directed primarily to the use of photostabilizer additives, such as UV absorber compounds. The most commonly used photostabilizers include benzophenones, benzotriazoles, and hindered amines. These compounds are typically applied to the fiber during the dyeing process by mixing the photostabilizer compound in the dyebath with the dyestuffs and with other conventional dyebath additives. The photostabilizer compound is adsorbed into the fibers along with the dyestuff molecules and serves to protect the dyestuff molecules from the destructive effects of the energy from absorbed UV light. The mechanisms involved in the photostabilization of a disperse dyestuff molecule by photostabilizer compounds have been extensively studied and reported in the literature and will not be treated here. Suffice it to say that in the photostabilization mechanism, it is important that the photostabilizer compound be in close proximity to the chromophoric group of the dyestuff in order that it can serve to protect the dyestuff molecule from photodegradation.

SUMMARY OF THE INVENTION

The present invention is a departure from the conventional approaches to improving lightfastness through the use of photostabilizer additives in the dyebath. The present invention, moreover, provides an approach to the design of disperse dyestuffs based upon incorporating the structural features of effective photostabilizers into the molecular structure of the dyestuff molecule itself. The dyestuff molecules possess the desirable lightfastness properties of a photostabilizer while maintaining the necessary chromophoric and substantive properties of a disperse dyestuff. In this sense, disperse dyestuffs according to the present invention may be viewed as "hybrid" dyestuffs which have been specifically designed and engineered to function both as a photostabilizer and as a dyestuff. Each individual dyestuff molecule is assured of having its chromophoric groups in close proximity to a photostabilizer, since the hybrid dyestuff molecule has built into it the molecular structural features of an effective photostabilizer.

In accordance with the present invention, lightfast disperse dyestuffs are produced by first selecting a "model" or "prototype" disperse dyestuff having predetermined chromophoric groups, and also selecting a photostabilizer compound having photostabilization properties. A hybrid disperse dyestuff molecular structure is designed which contains the chromophoric groups of the selected disperse dyestuff and also contains the molecular structural features of the selected photostabilizer compound, and the thus designed hybrid disperse dyestuff molecule is synthesized.

DETAILED DESCRIPTION OF THE INVENTION

The photostabilizers which are most preferred for incorporation into the dyestuffs of the present invention are those photostabilizer compounds which have heretofore been used as photostabilizer additives to dyebaths in conventional dyeing processes. These photostabilizer compounds generally fall into one of three main structural types: the benzophenones, having the general structural formula:

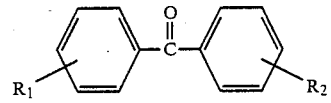

where $R_1$=H, OH, OMe and $CH_3$ and $R_2$=H, OH, OMe and $CH_3$
the benzotriazoles, having the general structural formula:

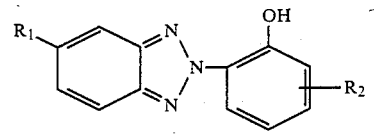

where $R_1$=H, OH, OMe, $NH_2$, $CH_3$, and Cl and $R_2$=H, $NH_2$, $CH_3$, and $C(CH_3)_3$
and the hindered amines, whose general structural formula is as follows:

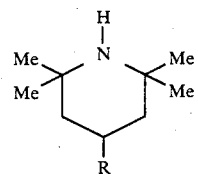

where R=H, OH, $NH_2$ and amino alkyl.

Disperse dyestuffs may be classified chemically as aminoazobenzenes (azo dyes), aminoanthraquinones (anthraquinone dyes) and nitrodiarylamines (nitro dyes). The characteristic structural unit of azo dyes is the —N=N— chromophoric group, and this classification of dyes includes monoazo, disazo, trisazo and tetrakisazo dyes, according to the number of —N=N— groups present in the dye molecule. The characteristic structural unit of the anthraquinone dyes is anthraquinone:

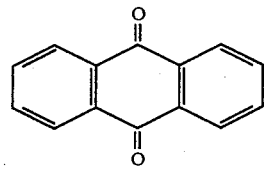

including the chromophoric groups: >C=O and >C=C<. The nitro dyestuffs are characterized by the structural unit $ArNO_2$.

In designing the molecular structure of dyestuffs in accordance with the present invention, it is desirable to keep the molecular structures as compact and small as possible in order to get optimum penetration and adsorption into the fibers. Therefore, hybrid molecular structures in which the photostabilizer moiety is *incorporated into* the dyestuff structure are preferred over structures which would result from *attachment* of a photostabilizer molecule to a dyestuff molecule through a bridging group.

For example, upon examining the molecular structural features of Disperse Yellow 42

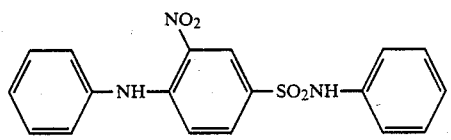

and a typical benzophenone:

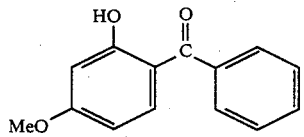

it will be seen that through the addition of a hydroxybenzoyl group to the dyestuff molecule, a benzophenone moiety can be generated in the structure, yielding lightfast analogs of Disperse Yellow 42 such as the following:

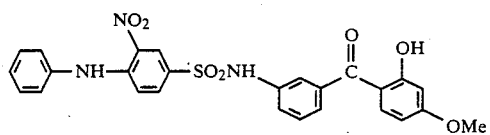

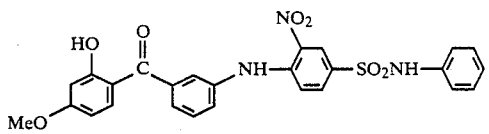

In this instance, one of the phenyl groups present in the dyestuff molecule is shared by the benzophenone moiety. Thus, this approach to designing a lightfast disperse dyestuff entails examining the molecular structure of the selected dyestuff and the selected photostabilizer compound to identify an atom or group of atoms common to both and designing a hybrid disperse dyestuff molecular structure which includes the structural features of both the selected dyestuff and the selected photostabilizer and which shares the identified common atom or group of atoms. The thus designed hybrid disperse dyestuff is then synthesized by selecting appropriate intermediates and reacting them to produce the desired molecular structure.

Light stabilized dyestuffs can also be produced by incorporating a benzotriazole structure into the molecular structure of a dyestuff such as Red Dye 167 as illustrated by the following azo dyestuff structures:

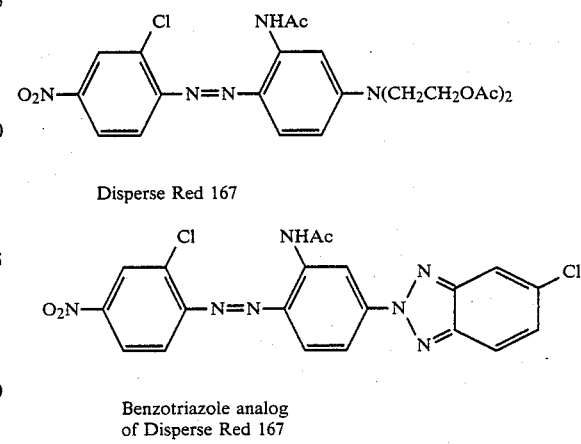

Disperse Red 167

Benzotriazole analog
of Disperse Red 167

In this instance, the $-N(CH_2CH_2OAc)_2$ group of the prototype dyestuff is replaced by the benzotriazole moiety and the pendant nitrogen atom is shared by the molecular structures of the dyestuff portion and the photostabilizer portion.

Light stabilized dyestuffs can also be produced by incorporating a hindered amine moiety into the molecular structure of a dyestuff as illustrated by the following anthraquinone dyestuff structures:

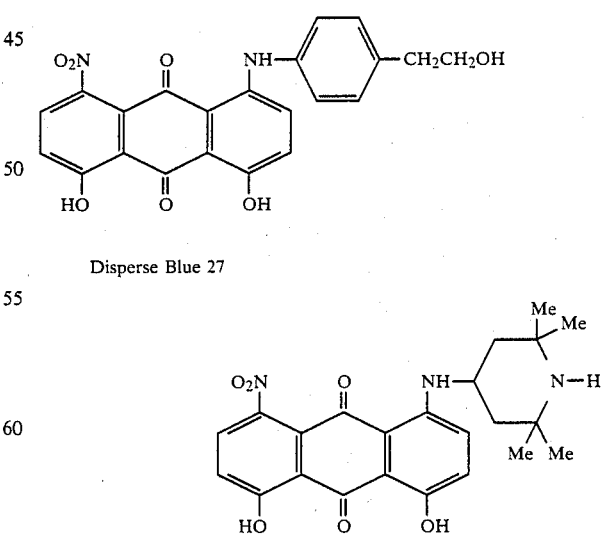

Disperse Blue 27

Hindered amine analog
of Disperse Blue 27

In this instance, the β-hydroxyethylphenyl group of the prototype dyestuff is replaced by the hindered amine moiety, which is somewhat similar in structure, but possesses photostabilizer properties.

The full scope of the present invention, and the broad range of dyestuffs which can be produced thereby, will be understood more fully from the illustrative examples which follow:

HYBRID NITRO DYESTUFFS WITH BENZOPHENONE PHOTOSTABILIZERS

Example 1

The nitro dyestuff Disperse Yellow 42

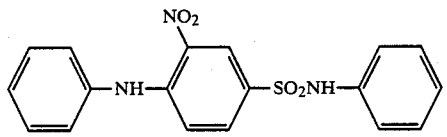

was selected as the prototype dyestuff for which a UV lightfast analog would be prepared. The photostabilizer 2-hydroxy-4-methoxybenzophenone

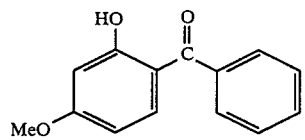

was selected as the benzophenone photostabilizer. The molecular structures of these compounds were examined to identify an atom or group of atoms that would be made common to the dyestuff and the photostabilizer, and the unsubstituted phenyl group was identified. Thus a hybrid disperse dyestuff molecule was designed as follows:

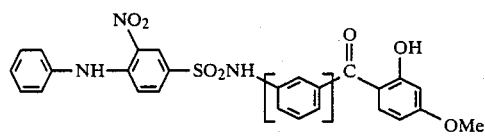

where the bracketed phenyl group is shared as the common group. This hybrid disperse dyestuff molecule, which is an analog of Disperse Yellow 42, contains molecular structural features of the dyestuff including the chromophoric group —$NO_2$ and molecular structural features of the benzophenone photostabilizer compound.

Example 2

The prototype nitro dyestuff was Disperse Yellow 42 as in Example 1 and 2-hydroxy-4-methoxybenzophenone

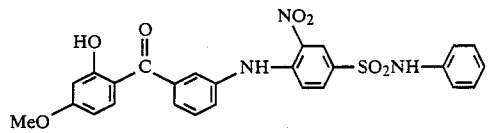

was selected as the photostabilizer. After examining both molecular structures, it can be seen that by adding the appropriate hydroxymethoxybenzoyl group to the dyestuff, the benzophenone moiety can be generated in the dyestuff structure. Thus the following hybrid disperse dyestuff molecule was designed:

It will be seen that a benzophenone photostabilizer structure can also be provided at both sides of the dyestuff structure. Thus, another hybrid disperse dyestuff molecule was designed as follows:

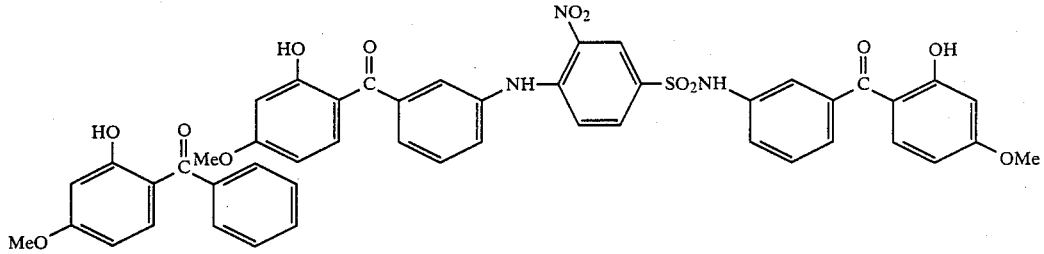

By utilizing a nitro dye like Disperse Yellow 42 and a benzophenone photostabilizer having the general structure:

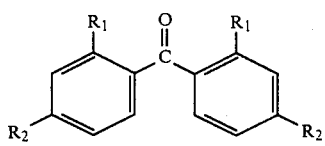

where $R_1$ and $R_2$ are H, OH and OMe, and a number of other hybrid disperse dyestuff molecules can be designed. Exemplary general structures include:

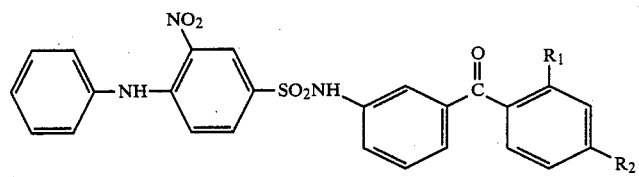

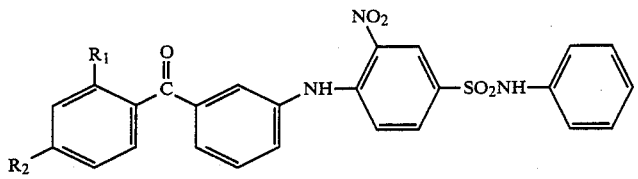

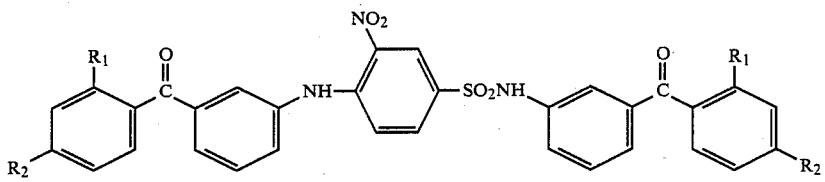

where $R_1 = $ H, OH and OMe and $R_2 = $ H, OH and OMe.

HYBRID NITRO DYESTUFFS WITH A BENZOTRIAZOLE PHOTOSTABILIZER

Example 3

The prototype nitro dyestuff was Disperse Yellow 42 and the following benzotriazole photostabilizer was selected:

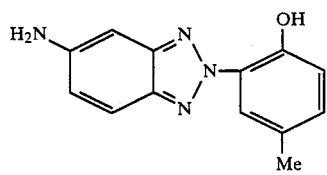

The identified common group of atoms in both the dyestuff and the photostabilizer is a phenyl group. The following hybrid disperse dyestuff was designed:

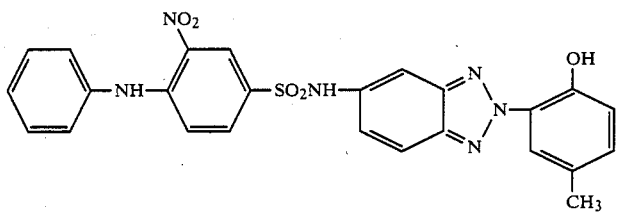

Other hybrid dyestuff molecules with benzotriazole photostabilizers can be synthesized by using different benzotriazole compounds having the general formula:

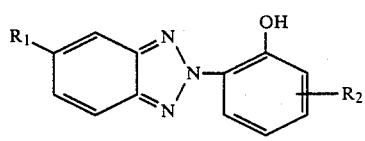

where $R_1 = $ H, OH, OMe, $NH_2$, $CH_3$, and Cl and $R_2 = $ H, $NH_2$, $CH_3$, and $C(CH_3)_3$.

HYBRID NITRO DYESTUFFS WITH A HINDERED AMINE PHOTOSTABILIZER

Example 4

The prototype nitro dyestuff was Disperse Yellow 42 and the following hindered amine photostabilizer, amine 4-amino-2,2,6,6-tetramethylpiperidine

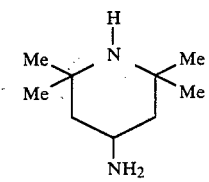

was selected as the photostabilizer. The following hybrid dyestuff molecule was designed:

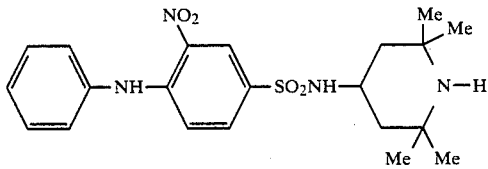

This dyestuff molecule contains the molecular structural features of the hindered amine photostabilizer and the molecular structural features of the Disperse Yellow 42 nitro dyestuff, including the —$NO_2$ chromophoric group thereof.

HYBRID AZO DYESTUFFS WITH BENZOPHENONE PHOTOSTABILIZERS

Example 5

The azo dyestuff Disperse Red 167

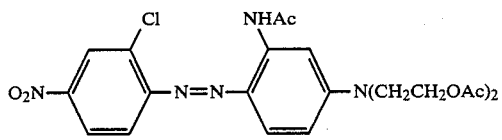

was selected as the prototype dyestuff. The benzophenone stabilizer 2-hydroxy-4-methoxybenzophenone

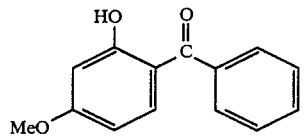

was selected as the photostabilizer. A hybrid disperse dyestuff molecule of the following structure was designed:

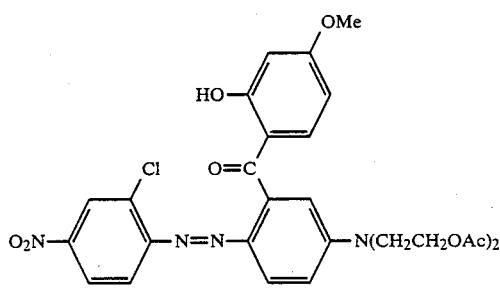

Although this dyestuff contains a benzoyl group in place of the acetamide group of Disperse Red 167, the same type interaction between the azo linkage and the benzoyl group that occurs between the azo linkage and the acetamide group will occur upon exposure to light.

The designed hybrid dyestuff contains the molecular structural features of the benzophenone photostabilizer and molecular structure features of the Red Dye 167 azo dyestuff, including the —N=N— chromophoric group thereof.

Example 6

The prototype azo dyestuff was Disperse Red 167 and the benzophenone photostabilizer derivative, 3-amino-2'-hydroxy-4'-methoxybenzophenone

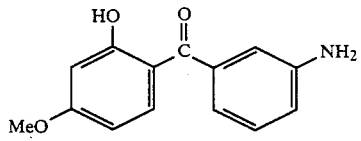

was selected. The following hybrid disperse dyestuff was designed so as to contain the molecular structural features of the Red Dye 167 and including the —N=N— chromophoric group and the molecular structural features of the benzophenone photostabilizer:

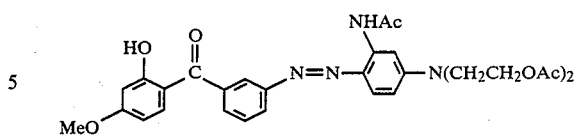

Example 7

The prototype azo dyestuff was Red Dye 167 and the benzophenone photostabilizer selected was:

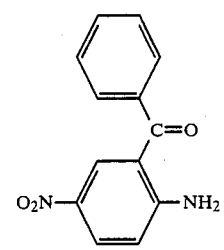

A hybrid disperse dyestuff molecule of the following structure was designed:

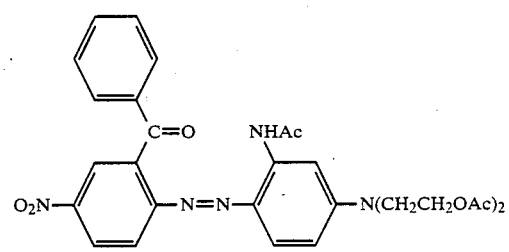

The hybrid dyestuff structure contains the molecular structural features of the benzophenone photostabilizer and the molecular structural features of Red Dye 167 azo dyestuff including the —N=N— chromphoric group.

HYBRID ANTHRAQUINONE DYESTUFFS WITH A HINDERED AMINE PHOTOSTABILIZER

EXAMPLE 8

The anthraquinone dyestuff Disperse Blue 27

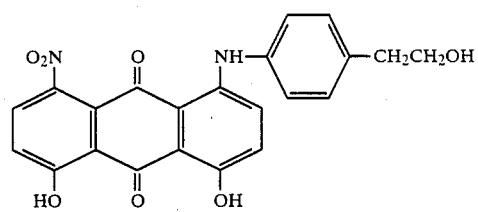

was selected as the prototype dye. The hindered amine photostabilizer, amine 4-amino-2,2,6,6-tetramethylpiperidine,

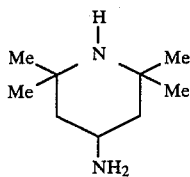

A hybrid dyestuff molecule having the following structure was designed:

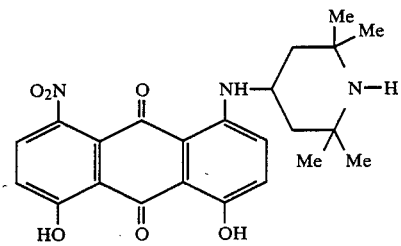

This dyestuff molecule has the molecular structural features of the hindered amine photostabilizer and the molecular structural features of Disperse Blue 27, including the chromophoric groups thereof.

Example 9

A blue anthraquinone dyestuff, Disperse Blue 56

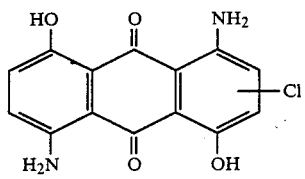

was selected as the prototype dyestuff. The benzophenone photostabilizer derivative, 3-amino-2'-hydroxy-4'-methoxybenzophenone

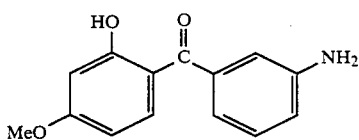

was selected. The hybrid disperse dyestuff molecule designed was:

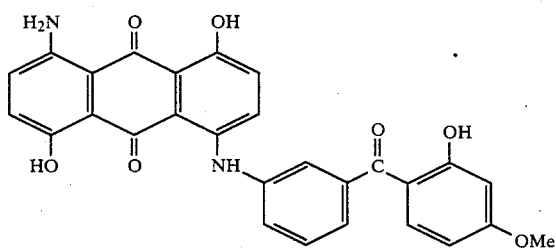

This dyestuff molecule has the molecular structural features of the benzophenone photostabilizer and the molecular structural features of the anthraquinone dye, Disperse Blue 56, including the chromophoric groups thereof.

HYBRID ANTHRAQUINONE DYESTUFF WITH A BENZOPHENONE PHOTOSTABILIZER

Example 10

A blue anthraquinone disperse dyestuff, Disperse Blue 27

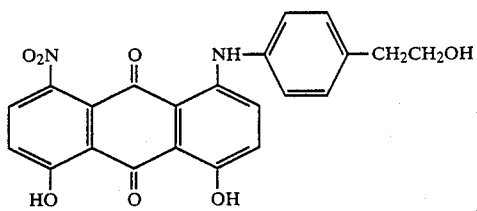

was selected as the prototype dyestuff. The benzophenone photostabilizer derivative selected was 3-amino-2'-hydroxy-4'-methoxybenzophenone:

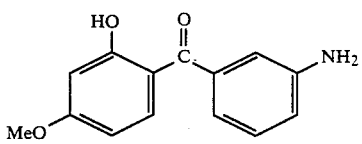

A hybrid disperse dyestuff molecule of the following structure was designed:

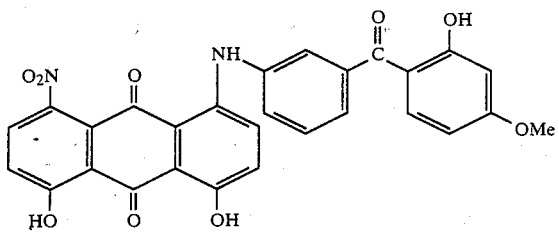

This dyestuff contains the molecular structural features of the benzophenone photostabilizer and the molecular structural features of the anthraquinone dyestuff, Disperse Blue 27, including the chromophoric groups thereof.

SYNTHESIS OF HYBRID NITRO DYESTUFFS

Example 11

The synthesis of the hybrid disperse dyestuff designed in Example 1 required the dyestuff intermediate

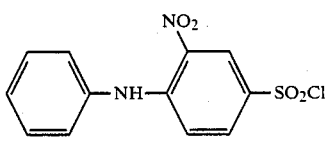

The required aminomethoxyhydroxybenzophenone photostabilizer intermediate was prepared by the reaction:

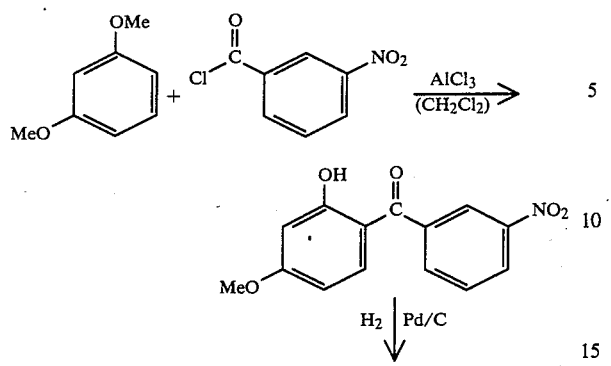

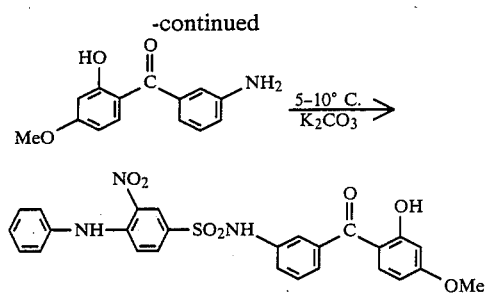

Example 12

The hybrid disperse dyestuff designed in Example 4 was synthesized by the reaction of a nitrodiphenylamine sulfonyl chloride and a hindered amine photostabilizer, amine 4-amino-2,2,6,6-tetramethylpiperidine:

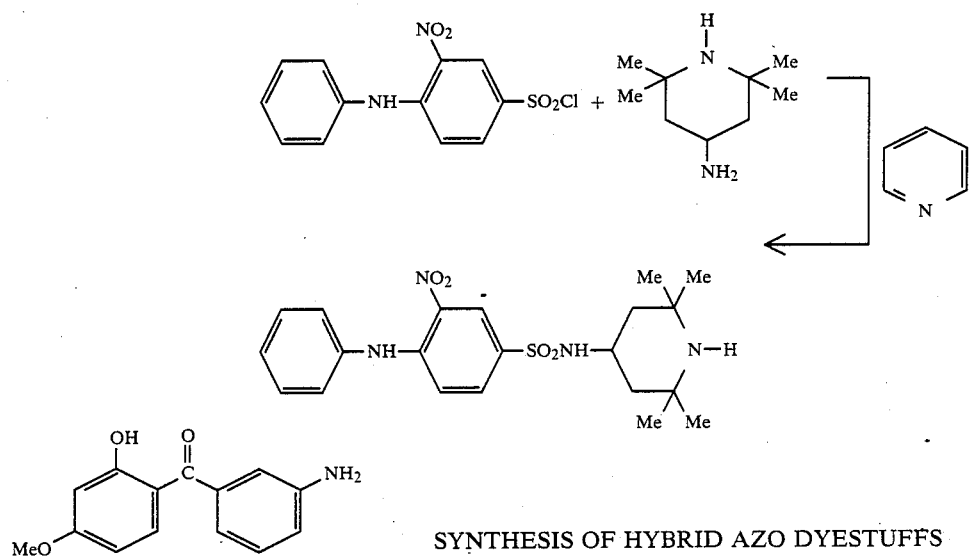

The dyestuff intermediate and the photostabilizer were combined in the reaction:

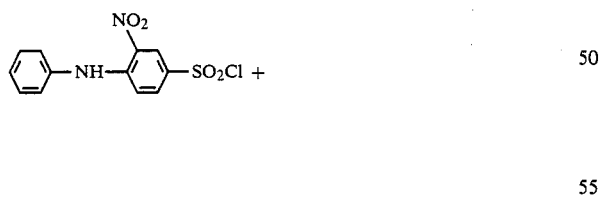

SYNTHESIS OF HYBRID AZO DYESTUFFS

Example 13

The hybrid disperse dyestuff designed in Example 5 was synthesized by starting with 3-nitro-2'-hydroxy-4'-methoxybenzophenone and used in the reaction:

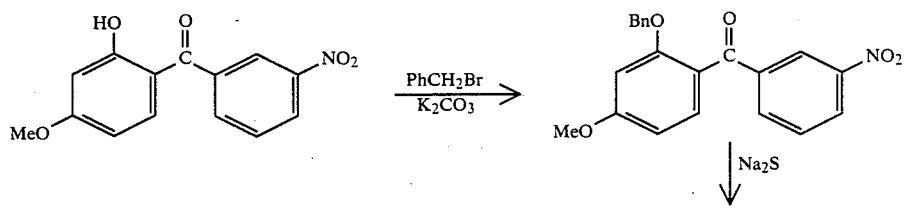

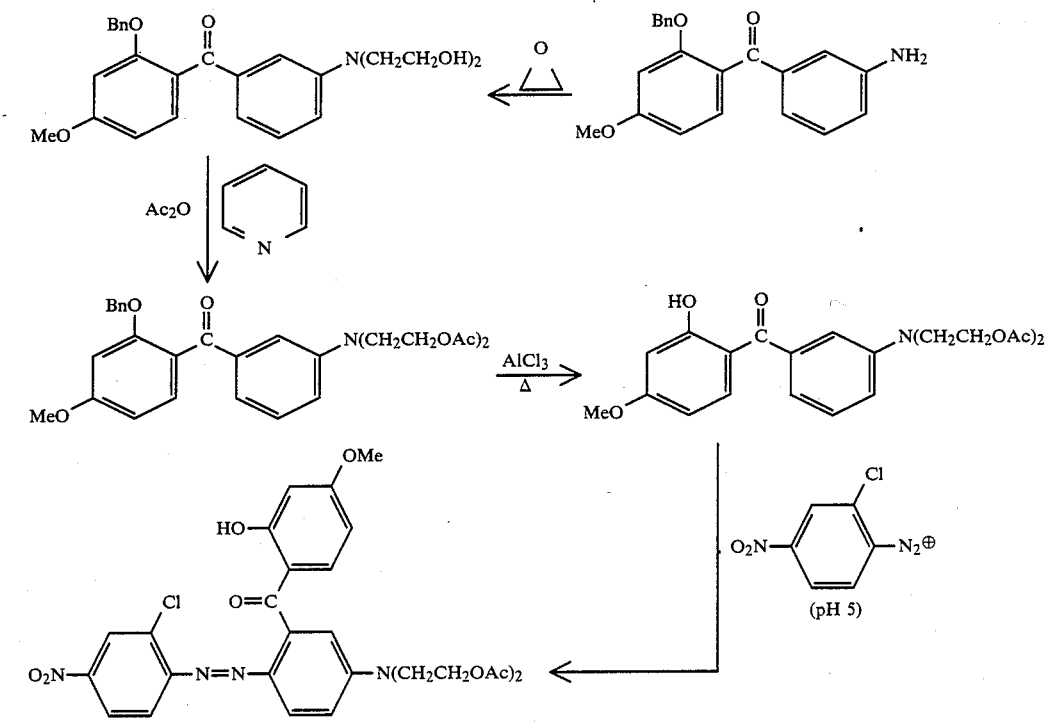

Example 14

The hybrid disperse dyestuff designed in Example 6 was synthesized by the reaction of an azo dyestuff intermediate:

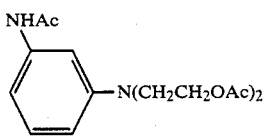

and the diazonium salt of the benzophenone photostabilizer derivative 2-amino-4-nitrobenzophenone.

Example 15

The hybrid disperse dyestuff designed in Example 7 was synthesized by first preparing the selected benzophenone photostabilizer derivative:

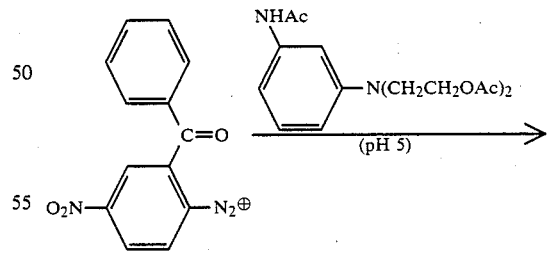

This compound was diazotized using $HNO_2$ and added to the azo dyestuff intermediate of Example 14 at a pH of 5 to form the hybrid dyestuff:

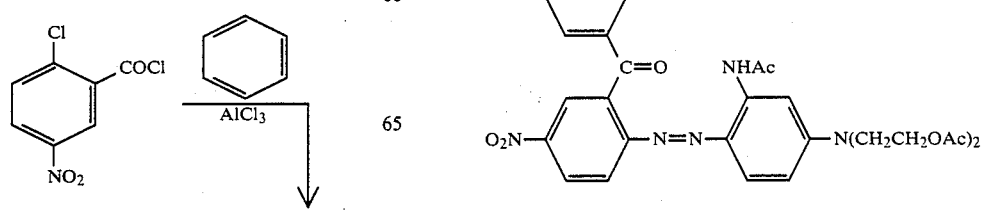

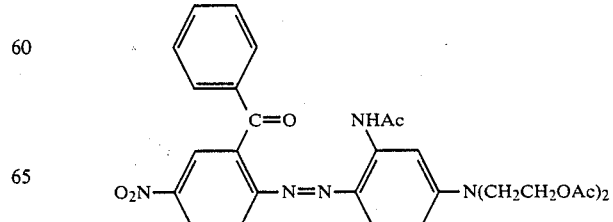

SYNTHESIS OF HYBRID ANTHRAQUINONE DYESTUFFS

Example 16

The hybrid disperse dyestuff designed in Example 9 was prepared by reacting 4,8-dinitroanthrarufin with 3-amino-2'-hydroxy-4'-methoxybenzophenone in the presence of heat followed by reduction with $Na_2S$.

Example 17

The hybrid disperse dyestuff designed in Example 10 was prepared by reacting 4,5-dinitrochrysazine with 3-amino-2'-hydroxy-4'-methoxybenzophenone in the presence of heat.

Example 18

A fabric sample dyed with the hybrid disperse dyestuff designed in Example 1 and synthesized in Example 13

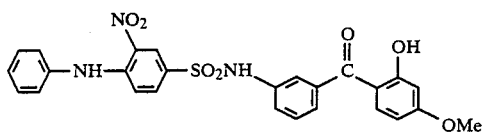

was exposed to 233.2 kilojoules per square meter of UV light. A fabric sample dyed with Disperse Yellow 42 was also exposed to the same amount of UV light. Using a lightfastness rating based on a scale of 1 to 5 with a desired lightfastness rating of 5 indicating no change, the samples were compared. The hybrid dyestuff had a lightfastness rating of 3.3 and the Disperse Yellow 42 dyestuff had a lightfastness rating of 1.5.

As is readily apparent from the foregoing examples, a multiplicity of hybrid dyestuffs can be designed and synthesized by practice of the present invention. These examples are provided as illustrations of the broad scope of the principles, preferred embodiments and modes of operation of the present invention. The invention which is intended to be protected herein, however, should not be construed as limited to the particular forms disclosed since those are to be regarded as illustrative rather than restrictive. Variations and changes may be made by those skilled in the art without departing from the spirit of the invention, particularly with respect to the choice of other specific azo, anthraquinone and nitro dyes and other specific photostabilizer compounds.

That which is claimed is:

1. A method of producing a UV lightfast disperse dyestuff comprising selecting a disperse dyestuff having predetermined chromophoric groups, selecting a photostabilizer compound, designing a hybrid disperse dye compound the molecular structure of which contains the chromophoric groups of the selected disperse dyestuff and contains the molecular structural features of the selected photostabilizer compound in close proximity to the chromophoric groups, and synthesizing the thus designed hybrid disperse dyestuff compound.

2. A method according to claim 1 wherein the step of selecting a photostabilizer compound comprises selecting a photostabilizer compound from the class consisting of benzophenones, benzotriazoles and hindered amines.

3. A method according to claim 1 wherein the step of selecting a disperse dyestuff comprises selecting a disperse dyestuff from the class consisting of azo dyes, anthraquinone dyes and nitro dyes.

4. A method according to claim 1 wherein the disperse dyestuff is selected from the class consisting of azo dyes and nitro dyes and the photostabilizer compound is selected from the group consisting of benzophenones and benzotriazoles.

5. A method according to claim 1 wherein the hybrid disperse dye molecular structure includes an anthraquinone dye structural unit and a benzophenone photostabilizer structural unit.

6. A method according to claim 1 wherein the hybrid disperse dye molecular structure includes an anthraquinone dye structural unit and a hindered amine photostabilizer structural unit.

7. A method according to claim 1 wherein the hybrid disperse dye molecular structure includes an azo dye structural unit and a benzotriazole photostabilizer structural unit.

8. A method according to claim 1 wherein the hybrid disperse dye molecular structure includes an azo dye structural unit and a benzophenone photostabilizer structural unit.

9. A method according to claim 1 wherein the hybrid disperse dye molecular structure includes a nitro dye structural unit and a benzotriazole photostabilizer structural unit.

10. A method according to claim 1 wherein the hybrid disperse dye molecular structure includes a nitro dye structural unit and a benzophenone photostabilizer structural unit.

11. A method according to claim 1 wherein the hybrid disperse dye molecular structure includes a nitro dye structural unit and a hindered amine photostabilizer structural unit.

12. A method of producing a disperse dye having UV lightfast properties comprising selecting a disperse dyestuff from the class consisting on azo dyes, anthraquinone dyes and nitro dyes, selecting a photostabilizer compound from the class consisting of benzophenones, benzotriazoles and hindered amines, designing a hybrid disperse dye compound the molecular structure of which includes the structural features of both the selected dyestuff and the selected photostabilizer compound and in close proximity to each other, and synthesizing the thus designed hybrid disperse dyestuff compound.

13. A method of producing a disperse dye having UV lightfast properties comprising selecting a disperse dyestuff from the class consisting of azo dyes, anthraquinone dyes and nitro dyes, selecting a photostabilizer compound, examining the molecular structure of each to identify an atom or group of atoms common to both, designing a hybrid disperse dye compound the molecular structure of which includes the structural features of both the selected dyestuff and the selected photostabilizer and which shares the identified common atom or group of atoms, and synthesizing the thus designed hybrid disperse dyestuff compound.

14. A method according to claim 13 wherein the atom or group of atoms common to the dyestuff and the photostabilizer comprises a phenyl group, and the selected photostabilizer comprises a benzophenone.

15. A method according to claim 13 wherein the atom or group of atoms common to the dyestuff and the photostabilizer comprises an aniline group, and the selected photostabilizer comprises a benzophenone.

16. A method according to claim 13 wherein the atom or group of atoms common to the dyestuff and the photostabilizer comprises a —NH group, and the selected photostabilizer comprises a benzophenone.

17. A method of producing a disperse dye having UV lightfast properties comprising selecting an azo or nitro disperse dyestuff, selecting a benzophenone photostabilizer compound, examining the molecular structure of each to identify a phenyl group ring common to the molecular structure of both the selected dyestuff and the selected benzophenone, designing a hybrid disperse dye compound the molecular structure of which includes the structural features of both the selected dyestuff and the selected benzophenone photostabilizer and which shares the identified common phenyl group, and synthesizing the thus designed hybrid disperse dyestuff compound.

* * * * *